United States Patent
Liu et al.

(10) Patent No.: US 11,855,464 B1
(45) Date of Patent: Dec. 26, 2023

(54) WIRELESS SYNCHRONOUS TRANSMISSION SYSTEM OF ENERGY AND SIGNAL BASED ON INTEGRATED MAGNETIC CIRCUIT COUPLING STRUCTURE

(71) Applicant: Zhejiang University, Hangzhou (CN)

(72) Inventors: Zhitao Liu, Hangzhou (CN); Jia Liu, Hangzhou (CN); Wenjie Chen, Hangzhou (CN); Hongye Su, Hangzhou (CN)

(73) Assignee: Zhejiang University, Hangzhou (CN)

( * ) Notice: Subject to any disclaimer, the term of this patent is extended or adjusted under 35 U.S.C. 154(b) by 0 days.

(21) Appl. No.: 18/343,787

(22) Filed: Jun. 29, 2023

Related U.S. Application Data (63) Continuation of application No. PCT/CN2022/113574, filed on Aug. 19, 2022.

(30) Foreign Application Priority Data

Aug. 16, 2022 (CN) .......................... 202210980686.X (51) Int. Cl.
*H02J 50/12* (2016.01)
*H01F 38/14* (2006.01)
(Continued)

(52) U.S. Cl.
CPC .............. *H02J 50/12* (2016.02); *H01F 38/14* (2013.01); *H02J 50/005* (2020.01); *H01F 27/25* (2013.01)

(58) Field of Classification Search
CPC ......... H02J 50/12; H02J 50/005; H01F 38/14; H01F 27/25
(Continued)

(56) References Cited

U.S. PATENT DOCUMENTS

| 9,728,997 B2 * | 8/2017 | Kim ........................ H02J 50/12 |
| 10,250,072 B2 * | 4/2019 | Ng ........................... H02J 50/40 |

(Continued)

FOREIGN PATENT DOCUMENTS

| CN | 105634093 A | 6/2016 |
| CN | 108390472 A | 8/2018 |

(Continued)

OTHER PUBLICATIONS

Zhang Tianyu, et al., The coupled resonances wireless power transfer system based on parallel resonance receiver, Power Supply Technology and Its Application, 2016, pp. 123-125, 132, vol. 42 No.1.

*Primary Examiner* — Alfonso Perez Borroto
(74) *Attorney, Agent, or Firm* — Bayramoglu Law Offices LLC (57) ABSTRACT

A single-channel wireless synchronous transmission system of energy and signal based on an integrated magnetic circuit coupling structure is provided. The system includes a direct current power supply, a high-frequency inverter circuit, a primary energy transmitter circuit, a secondary receiver circuit, a rectifier circuit, a load, a signal modulation circuit and a signal demodulation circuit. The secondary receiver circuit includes a secondary energy receiver circuit and a secondary signal receiver circuit, where an energy receiver coil and a signal receiver coil are superposed on top of each other, and the energy receiver coil and the signal receiver coil are decoupled from each other and form an integrated magnetic circuit coupling structure with a transmitter coil of the primary energy transmitter circuit.

12 Claims, 5 Drawing Sheets

(51) Int. Cl.
*H02J 50/00* (2016.01)
*H01F 27/25* (2006.01)

(58) Field of Classification Search
USPC .......................................................... 307/104
See application file for complete search history.

(56) References Cited

U.S. PATENT DOCUMENTS

2015/0054344 A1* 2/2015 Ng .......................... H02J 50/12
307/104
2015/0214788 A1* 7/2015 Hosotani ................. H02J 50/12
307/104

FOREIGN PATENT DOCUMENTS

| CN | 110190686 A | 8/2019 |
| WO | 2017213032 A1 | 12/2017 |

* cited by examiner

WIRELESS SYNCHRONOUS TRANSMISSION SYSTEM OF ENERGY AND SIGNAL BASED ON INTEGRATED MAGNETIC CIRCUIT COUPLING STRUCTURE

CROSS REFERENCE TO THE RELATED APPLICATIONS

This application is a continuation application of International Application No. PCT/CN2022/113574, filed on Aug. 19, 2022, which is based upon and claims priority to Chinese Patent Application No. 202210980686.X, filed on Aug. 16, 2022, the entire contents of which are incorporated herein by reference.

TECHNICAL FIELD

The present disclosure relates to a wireless synchronous transmission system of energy and signal in the field of vehicle wireless charging systems, and in particular, to a single-channel wireless synchronous transmission system of energy and signal based on an integrated magnetic circuit coupling structure.

BACKGROUND

There are two main charging methods for electric vehicles: one is wired charging, also referred to as contact charging; the other is wireless charging, also referred to as contactless charging, and is a newer charging method. Wireless charging mainly uses a wireless power transfer (WPT) technology, and currently there are three main forms of wireless power transfer: inductive wireless power transfer, resonant wireless power transfer, and microwave wireless power transfer.

Wireless charging is easy to use, safe, reliable, with no danger of electric spark or electric shock. Other advantages are: no dust accumulation and contact loss, no mechanical wear, no corresponding maintenance problems, and adaptability to poor weather and environmental conditions, such as rain and snow. The wireless charging technology is widely applied in electric vehicles, smart phones, smart home appliances, AGV, and other fields. For most applications, closed-loop control of a wireless power transfer system requires a reliable information exchange between an energy transmitter and an energy receiver to achieve maximum efficiency tracking, output transmission power adjustment, load status monitoring, etc.

Traditional communication technologies, such as Bluetooth, 2.4 G modules, Wi-Fi, and Zigbee, are widely applied in WPT applications for wireless data transmission. However, these technologies require complex address matching and are susceptible to electromagnetic noise caused by high-frequency switching in a wireless charging system. In addition, separate communication equipment needs to be used, which increases system complexity and cost. Thus, in recent years, synchronous transmission of energy and a signal in wireless power transmission systems has attracted extensive attention.

At present, there are mainly three energy and signal synchronous wireless transmission technologies: a dual-channel technology, an injection technology, and a single-channel technology.

A dual-channel transmission technology means that the energy and signal are transmitted respectively through two sets of coils, which can control energy transmission and signal transmission separately. While efficiency of signal transmission is improved, the existence of two sets of magnetic circuit mechanisms can result in strong cross coupling between power and a signal creating problems, such as electromagnetic interference. Further, two sets of channels increase the system complexity and cost.

Injection technology couples a high-frequency carrier to output square wave voltage of a high-frequency inverter circuit through a coupling coil for energy and signal synchronous transmission. However, this method only loads a signal on a positive half cycle of an inverter square wave, and the signal transmission rate is limited by the operating frequency of the high-frequency inverter circuit, resulting in low a signal transmission rate.

In single-channel transmission technology, the energy transmission and signal transmission share the same transmission channel. This technology does not require additional equipment, and the system structure is simple and easy to implement. At present, synchronous transmission technology of power and signal implemented by using a single channel generally adopts three methods: a binary amplitude shift keying method, a binary frequency shift keying method, and a binary phase shift keying method. These three methods achieve signal modulation by changing the input voltage, operating frequency and phase shift angle of the high-frequency inverter circuit separately, however, these traditional modulation methods have the disadvantages of a low signal transmission rate and are easy to greatly impact the system output voltage.

SUMMARY

In order to resolve a problem in the background technology, the present disclosure provides a single-channel wireless synchronous transmission system of energy and signal based on an integrated magnetic circuit coupling structure, which does not require introduction of additional equipment, and uses system harmonics as signal carriers. Under a condition of not affecting energy transmission of a wireless power transmission system, energy transmission and signal transmission in the system share a same transmission channel, to realize high-speed, efficient, and synchronous transmission of energy and signal. This makes the system simpler and more compact, reduces use cost, is easy to implement, and improves system stability.

The present disclosure adopts the following technical solutions:

The present disclosure includes a direct current power supply, a high-frequency inverter circuit, a primary energy transmitter circuit, a secondary receiver circuit, a rectifier circuit, a load, a signal modulation circuit and a signal demodulation circuit.

The high-frequency inverter circuit has an input terminal connected to the direct current power supply, and an output terminal connected to the primary energy transmitter circuit, the high-frequency inverter circuit is connected to the signal modulation circuit, and the signal modulation circuit is configured to control an operating frequency of the high-frequency inverter circuit; the secondary receiver circuit includes a secondary energy receiver circuit and a secondary signal receiver circuit, the secondary energy receiver circuit is connected to the secondary signal receiver circuit, the primary energy transmitter circuit is connected to the secondary energy receiver circuit and the secondary signal receiver circuit through electromagnetic induction, an output of the energy receiver circuit is connected to the rectifier circuit, the rectifier circuit outputs direct current power and transmits the direct current power to the load, and the secondary signal receiver circuit is connected to the signal demodulation circuit; the high-frequency inverter circuit converts direct current power output from the direct current power supply into high-frequency alternating current, the high-frequency alternating current forms a high-frequency sine wave after passing through the primary energy transmitter circuit, the high-frequency sine wave acts on the primary energy transmitter circuit, and the primary energy transmitter circuit transmits energy to the secondary energy receiver circuit and transmits a signal to the secondary signal receiver circuit through electromagnetic induction; a working resonance point of the secondary energy receiver circuit is set to a first harmonic frequency of the high-frequency sine wave, to realize energy transmission; and a working resonance point of the secondary signal receiver circuit is set to a third harmonic frequency of a sine wave, to realize signal transmission.

The primary energy transmitter circuit is a first RLC circuit composed of a first resistor, a primary transmitter coil, and a first capacitor that are connected in series, and the secondary energy receiver circuit is a second RLC circuit composed of a second resistor, an energy receiver coil, and a second capacitor that are connected in series, one terminal of the second capacitor and one terminal of the second resistor serve as an output of the secondary energy receiver circuit, and are connected to the rectifier circuit, the secondary signal receiver circuit is a third RLC circuit composed of a third resistor, a signal receiver coil, and a third capacitor that are connected in series, two terminals of the signal receiver coil are connected to the signal demodulation circuit, the energy receiver coil is connected in series with the second resistor and then set in parallel with the third RLC circuit, the primary transmitter coil is separately connected to the energy receiver coil and the signal receiver coil through electromagnetic induction, and the signal demodulation circuit performs signal demodulation based on a voltage signal of the signal receiver coil, to restore a data signal of the signal modulation circuit, where the primary transmitter coil, the energy receiver coil and the signal receiver coil form the integrated magnetic circuit coupling structure.

In the integrated magnetic circuit coupling structure, the primary transmitter coil is composed of a transmitter coil and a transmitting magnetic core layer stacked up and down, the energy receiver coil is disposed directly above the transmitter coil, the signal receiver coil and the energy receiver coil are stacked up and down, and a receiving magnetic core layer is stacked on the signal receiver coil; and coil directions of the signal receiver coil and the energy receiver coil are orthogonal.

The transmitting magnetic core layer and the receiving magnetic core layer are composed of a plurality of ferrite strips with the same structural size, and the plurality of ferrite strips in each magnetic core layer are evenly laid on an upper surface or a lower surface of a corresponding coil, and a direction of the ferrite strip is perpendicular to a direction of the corresponding coil.

An area of the transmitting magnetic core layer and an area of the receiving magnetic core layer are 80% of an area of the transmitter coil and an area of the energy receiver coil respectively.

Dimensions of the transmitting magnetic core layer, the receiving magnetic core layer, the transmitter coil, the signal receiver coil, and the energy receiver coil meet the following requirements:

$$h1 = \frac{1}{2}l1$$

$$l2 = l1$$

$$h2 = \frac{8*(l1*h1*2)}{10l1},$$

where l1 is a length of the transmitter coil, the signal receiver coil, or the energy receiver coil, h1 is a width of the transmitter coil, the signal receiver coil, or the energy receiver coil, l2 is a length of each ferrite strip in the transmitting magnetic core layer or the receiving magnetic core layer, and h2 is a width of each ferrite strip in the transmitting magnetic core layer or the receiving magnetic core layer.

The high-frequency inverter circuit is a class E inverter circuit, a half-bridge inverter circuit, or a full-bridge inverter circuit; and the rectifier circuit is a full-bridge rectifier circuit, a half-bridge rectifier circuit, or a synchronous rectifier circuit.

The modulation circuit is composed of a frequency selector and a driver circuit that are connected to each other, and the driver circuit is connected to the high-frequency inverter circuit.

The signal demodulation circuit is composed of a voltage divider circuit, a signal rectifier circuit, a voltage follower, an envelope circuit, and a low-pass filter circuit, and a comparator circuit that are sequentially connected, and the voltage divider circuit is connected to the secondary signal receiver circuit.

The present disclosure has the following beneficial effects:

The present disclosure uses an energy transmission channel of a wireless energy transmission system to realize high-speed and high-efficiency signal transmission without affecting energy transmission. For this, a wireless synchronous transmission technology of power and signal using system harmonics as signal carriers is proposed. At the same time, an integrated magnetic circuit coupling structure is configured to make the system more compact, which reduces use cost, and improves system stability.

Reference numerals: direct current power supply 101; high-frequency inverter circuit 102; primary energy transmitter circuit 103; secondary receiver circuit 104; rectifier circuit 105; load 106; signal modulation circuit 107; signal demodulation circuit 108; receiving magnetic core layer 201; signal receiver coil 202; energy receiver coil 203; transmitter coil 204; and transmitting magnetic core layer 205.

DETAILED DESCRIPTION OF THE EMBODIMENTS

The present disclosure is further described below with reference to the accompanying drawings.

Figure 1:
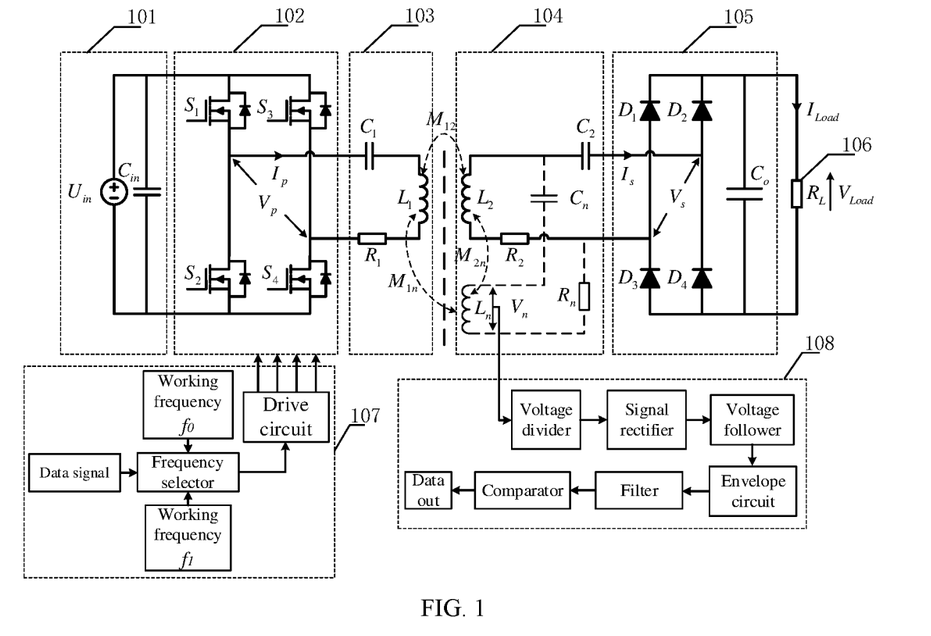
FIG. 1 is an overall structural circuit diagram of the present disclosure.

As shown in FIG. 1, the present disclosure includes direct current power supply 101, high-frequency inverter circuit 102, primary energy transmitter circuit 103, secondary receiver circuit 104, rectifier circuit 105, load 106, signal modulation circuit 107, and signal demodulation circuit 108.

The high-frequency inverter circuit 102 has an input terminal connected to the direct current power supply 101, and an operating frequency of the high-frequency inverter circuit 102 is 82 kHz to 100 kHz. The high-frequency inverter circuit 102 has an output terminal connected to the primary energy transmitter circuit 103, the high-frequency inverter circuit 102 is connected to the signal modulation circuit 107, and the signal modulation circuit 107 is configured to control an operating frequency of the high-frequency inverter circuit 102; the secondary receiver circuit 104 includes a secondary energy receiver circuit and a secondary signal receiver circuit, the secondary energy receiver circuit is connected to the secondary signal receiver circuit, the primary energy transmitter circuit 103 is connected to the secondary energy receiver circuit and the secondary signal receiver circuit through electromagnetic induction, an output of the energy receiver circuit is connected to the rectifier circuit 105, the rectifier circuit 105 outputs direct current power and transmits the direct current power to the load 106, and the secondary signal receiver circuit is connected to the signal demodulation circuit 108; the high-frequency inverter circuit 102 converts direct current power output from the direct current power supply 101 into high-frequency alternating current, the high-frequency alternating current forms a high-frequency sine wave after passing through the primary energy transmitter circuit 103, the high-frequency sine wave acts on the primary energy transmitter circuit 103, and the primary energy transmitter circuit 103 transmits energy to the secondary energy receiver circuit and transmits a signal to the secondary signal receiver circuit through electromagnetic induction; and the high-frequency sine wave is composed of a series of odd-numbered harmonics. As a harmonic frequency increases, corresponding harmonic content is greatly reduced. The high-frequency sine wave is mainly composed of first harmonics and third harmonics, and the first harmonics account for the vast majority, and can be used to implement energy transmission, and the third harmonics are used to implement signal transmission. Higher harmonics accounts for too little, and can be ignored. A working resonance point of the secondary energy receiver circuit is set to a first harmonic frequency of the high-frequency sine wave, to realize energy transmission; and a working resonance point of the secondary signal receiver circuit is set to a third harmonic frequency of a sine wave, to realize signal transmission.

Figure 2A:
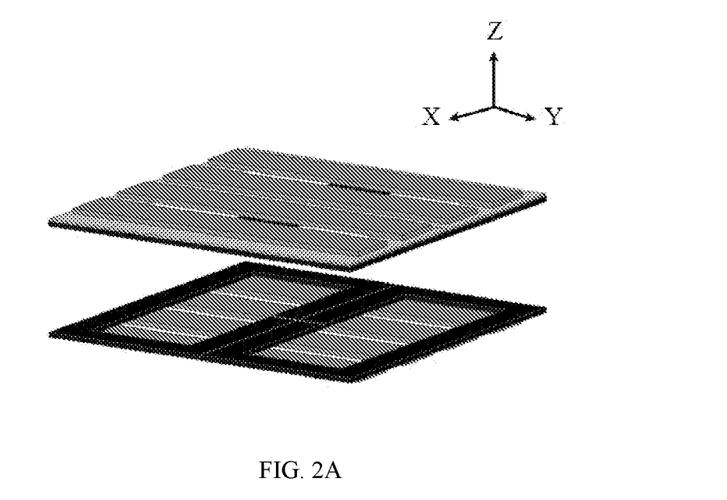
FIGS. 2A and 2B show an integrated magnetic circuit coupling structure.
Figure 2B:
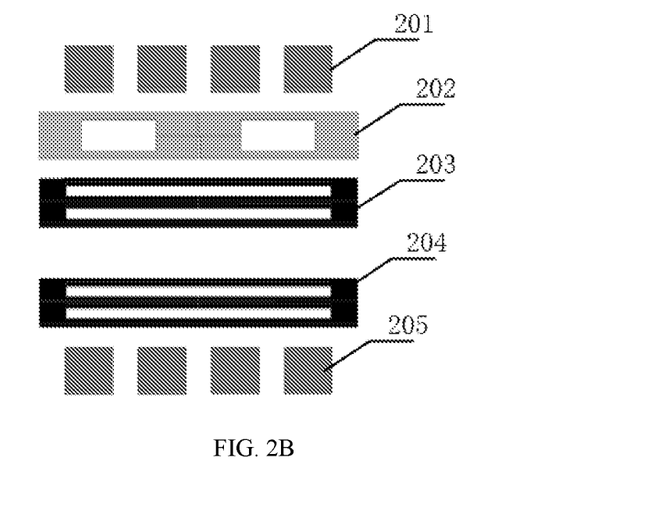

As shown in FIGS. 2A and 2B, the primary energy transmitter circuit 103 is a first RLC circuit composed of a first resistor, a primary transmitter coil, and a first capacitor that are connected in series, and the secondary energy receiver circuit 203 is a second RLC circuit composed of a second resistor, an energy receiver coil, and a second capacitor that are connected in series, one terminal of the second capacitor and one terminal of the second resistor serve as an output of the secondary energy receiver circuit, and are connected to the rectifier circuit 105, the secondary signal receiver circuit is a third RLC circuit composed of a third resistor, signal receiver coil 202, and a third capacitor that are connected in series, two terminals of the signal receiver coil 202 are connected to a voltage divider circuit of the signal demodulation circuit 108, the energy receiver coil 203 is connected in series with the second resistor and then set in parallel with the third RLC circuit, that is, the third RLC circuit is connected in series with the second capacitor, the primary transmitter coil is separately connected to the energy receiver coil 203 and the signal receiver coil 202 through electromagnetic induction, and the signal demodulation circuit 108 performs signal demodulation based on a voltage signal of the signal receiver coil 202, to restore a data signal of the signal modulation circuit 107, where the primary transmitter coil, the energy receiver coil 203 and the signal receiver coil 202 form the integrated magnetic circuit coupling structure.

During specific implementation, the primary energy transmitter circuit 103 is composed of first resonant capacitor $C_1$ and transmitter coil $204L_1$, the secondary energy receiver circuit is composed of second resonant capacitor $C_2$ and an energy receiver coil $203L_2$, and the secondary signal receiver circuit is composed of third resonant capacitor $C_n$ and signal receiver coil $202L_n$, which should satisfy the following relationship:

$$f = 1/2\pi\sqrt{L_1 C_1} = 1/2\pi\sqrt{L_2 C_2}$$

$$3f = \frac{1}{2\pi\sqrt{L_n C_n}}, \text{ where}$$

f is an operating frequency of the high-frequency inverter circuit 102, $L_1$, $L_2$, and $L_n$ are respectively inductance values of the transmitter coil 204, the energy receiver coil 203, and the signal receiver coil 202, and $C_1$, $C_2$, $C_n$ and are respectively capacitance values of the first resonant capacitor to the third resonant capacitor.

In the integrated magnetic circuit coupling structure, the primary transmitter coil is composed of transmitter coil 204 and transmitting magnetic core layer 205 stacked up and down, the energy receiver coil 203 is disposed directly above the transmitter coil 204 and spaced apart from the transmitter coil 204, the signal receiver coil 202 and the energy receiver coil 203 are stacked up and down, and receiving magnetic core layer 201 is stacked on the signal receiver coil 202; and the transmitter coil 204, the signal receiver coil 202, and the energy receiver coil 203 are all made up of two rectangular coils with same structural dimensions, and coil directions of the signal receiver coil 202 and the energy receiver coil 203 are orthogonal. Coil directions of the transmitter coil 204 and the energy receiver coil 203 are same.

The transmitting magnetic core layer 205 and the receiving magnetic core layer 201 are composed of a plurality of ferrite strips with the same structural size, and the plurality of ferrite strips in each magnetic core layer are evenly laid on an upper surface or a lower surface of a corresponding coil, and a direction of the ferrite strip is perpendicular to a direction of the corresponding coil. That is, the plurality of ferrite strips in the transmitting magnetic core layer 205 are evenly laid on a lower surface of the transmitter coil 204, and the direction of the ferrite strip is perpendicular to a direction of the transmitter coil 204. The plurality of ferrite strips in the receiving magnetic core layer 201 are evenly laid on an upper surface of the signal receiver coil 202, and the direction of the ferrite strip is perpendicular to a direction of the signal receiver coil 202. An area of the transmitting magnetic core layer 205 and an area of the receiving magnetic core layer 201 are 80% of an area of the transmitter coil 204 and an area of the energy receiver coil 203 respectively.

Specifically, dimensions of the transmitting magnetic core layer 205, the receiving magnetic core layer 201, the transmitter coil 204, the signal receiver coil 202, and the energy receiver coil 203 meet the following requirements:

$$h1 = \frac{1}{2}l1$$
$$l2 = l1$$
$$h2 = \frac{8*(l1*h1*2)}{10/1},$$

where l1 is a length of the transmitter coil 204, the signal receiver coil 202, or the energy receiver coil 203, h1 is a width of the transmitter coil 204, the signal receiver coil 202, or the energy receiver coil 203, l2 is a length of each ferrite strip in the transmitting magnetic core layer 205 or the receiving magnetic core layer 201, and h2 is a width of each ferrite strip in the transmitting magnetic core layer 205 or the receiving magnetic core layer 201.

The high-frequency inverter circuit 102 is a class E inverter circuit, a half-bridge inverter circuit, or a full-bridge inverter circuit; and the rectifier circuit 105 is a full-bridge rectifier circuit, a half-bridge rectifier circuit, or a synchronous rectifier circuit. In this embodiment, in order to improve a power level of the system, a full-bridge inverter circuit composed of four mosfet tubes is used, and a type of the mosfet tube is RU7588R.

In order to further illustrate the present disclosure, a size of the rectangular coil in this embodiment is 200 mm×100 mm, because a current that flows through in the transmitter coil 204 and the energy receiver coil 203 is large, so winding of Litz wires of 400 strands is adopted, and a current flowing through the signal receiver coil 202 is small, so winding of Litz wires of 200 strands is adopted. In order to further optimize the coverage of the magnetic core layer on the integrated magnetic circuit coupling structure, an integrated magnetic circuit coupling structure model is established in maxwell electromagnetic simulation software, and variations of a coupling coefficient of the transmitter coil 204 and the energy receiver coil 203, and inductances of the transmitter coil 204 at different magnetic core layer coverage areas are obtained and shown in FIG. 3 and FIG. 4, respectively.

Figure 3:
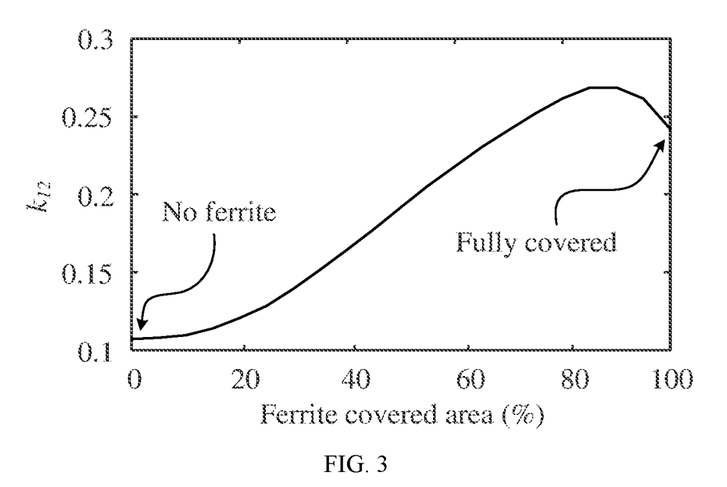
FIG. 3 is a relationship between coverage areas of a magnetic core layer and a coupling coefficient of a transmitter coil and a receiver coil.
Figure 4:
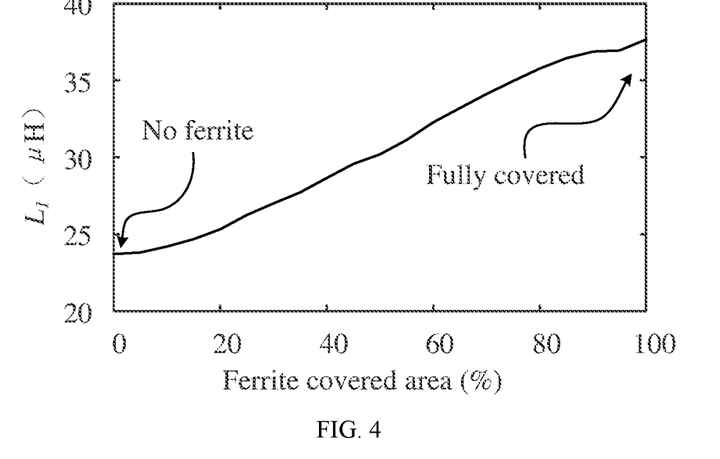
FIG. 4 is a relationship between coverage areas of a magnetic core layer and an inductance of a transmitter coil.

As shown in FIG. 3, as the coverage area of the magnetic core layer increases, the coupling coefficient k12 of the transmitter coil 204 and the energy receiver coil 203 first increases continuously and then slowly decreases, and when the coverage area of the magnetic core layer reaches 90%, a maximum value of the coupling coefficient k12 can be obtained. In the wireless energy transmission system, a value of k12 should be designed to be as large as possible in order to ensure system efficiency and stability. Therefore, the coverage area of the magnetic core layer should be selected around 90%. As shown in FIG. 4, the inductance of the transmitter coil 204 keeps increasing as the area covered by the magnetic core layer increases. However, a current of the transmitter coil 204 increases with an increase of the inductance of the transmitter coil 204, and an excessive current may burn the transmitter coil 204. Taking the above into consideration, the coverage area of the magnetic core layer in the present disclosure is selected to be 80%.

Figure 5:
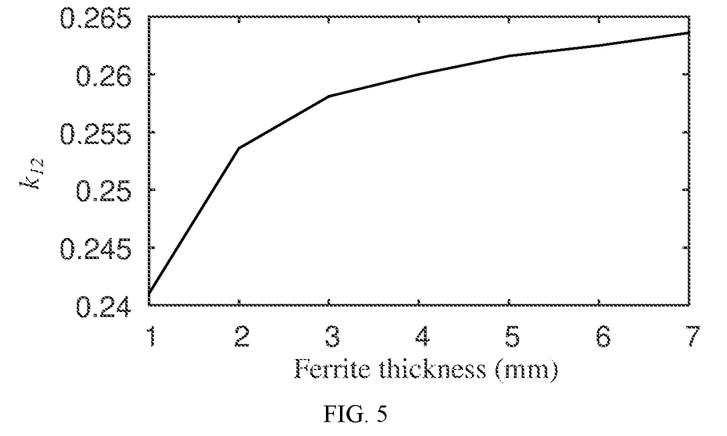
FIG. 5 is a relationship between different magnetic core layer thicknesses and a coupling coefficient of a transmitter coil and a receiver coil.
Figure 6:
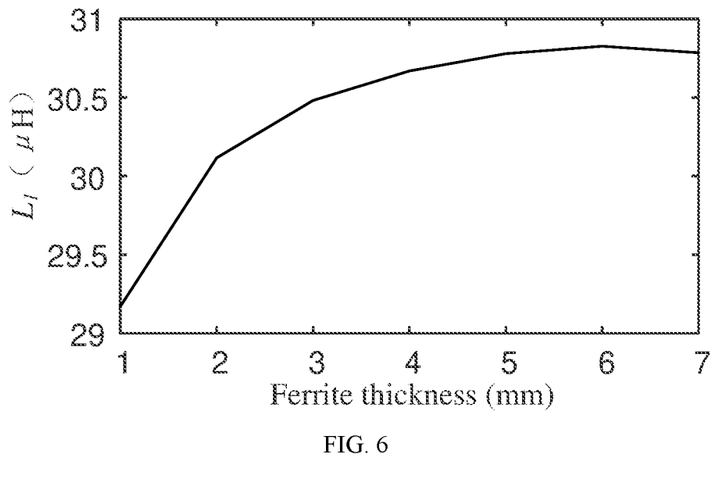
FIG. 6 shows a relationship between different magnetic core layer thicknesses and an inductance of a transmitter coil.

In order to analyze influence of different magnetic core layer thicknesses on the inductance of the transmitter coil, the coupling coefficient of the transmitter coil and the receiver coil, and further optimize a dimension structure of the integrated magnetic circuit coupling structure, magnetic circuit coupling structure models of different magnetic core layer thicknesses of a magnetic core layer coverage rate at 80% are established in the maxwell software. A relationship between different magnetic core layer thicknesses and the coupling coefficient of the transmitter coil and receiver coil is shown in FIG. 5, and a relationship between different magnetic core layer thicknesses and the inductance of the transmitter coil is shown in FIG. 6. As shown in FIG. 5, when the magnetic core layer thickness increases, the inductance of the transmitter coil first increases and then decreases, and the maximum value is when the thickness of the magnetic core layer is 6 mm. As shown in FIG. 6, when the magnetic core layer thickness increases from 1 mm to 2 mm, k12 increases significantly, and when the magnetic core layer thickness continues to increase, the increase in k12 is not obvious. When the magnetic core layer thickness increased, system cost increases, and a weight of the magnetic circuit coupling structure increases. Therefore, to sum up, in order to obtain large k12 and small inductance LI of the transmitter coil, as well as reduce the cost and weight of this coupling structure, the magnetic core layer thickness is selected as 2 mm. As shown in FIGS. 2A and 2B, a dimension of each ferrite strip in the magnetic core layer is 200 mm×34 mm×2 mm.

It should be noted that the embodiment in this specification is only for better explaining a special case of the present disclosure. When actually designing a wireless power transmission system, it is necessary to determine dimensions of the rectangular coils that make up the magnetic circuit coupling structure in combination with actual requirements. In this case, the dimensions of the magnetic circuit coupling structure can also be optimized based on the optimization method of this embodiment.

The modulation circuit 107 is composed of a frequency selector and a driver circuit that are connected to each other, and the driver circuit is connected to the high-frequency inverter circuit 102. The frequency selector selects different operating frequencies base on to the data signal. When the data signal is 0, the frequency selector selects a first working frequency f0, f0=92 kHz. When the data signal is 1, the frequency selector selects to use a second working frequency f1, f1=88 kHz. The drive circuit controls the working frequency of the high-frequency inverter circuit 102 based on the received working frequency, and modulates the data signal onto a high-frequency sine wave through switching the operating frequency of the high frequency inverter circuit 102.

The modulation circuit 107 is based on a frequency deviation amplification effect. When the operating frequencies f0 and f1 of the high-frequency inverter circuit 102 are switched within a small range, an amplitude of the third harmonic component can be greatly changed, thereby causing a voltage on the signal receiver coil 202 to change, to achieve signal transmission. Because an operating frequency switching range of the high-frequency inverter circuit 102 is very small, impact on energy transmission while the system transmits signals is negligible, and the small range is specifically not greater than 5 kHz.

The signal demodulation circuit 108 is composed of a voltage divider circuit, a signal rectifier circuit, a voltage follower, an envelope circuit, and a low-pass filter circuit, and a comparator circuit that are sequentially connected, and the voltage divider circuit is connected to both terminals of the signal receiver coil 202 of the secondary signal receiver circuit.

A voltage signal at the both terminals of the signal receiver coil 202 is divided by the voltage divider circuit and then input to the signal rectifier circuit to be converted into a direct current voltage, and then the signal demodulation circuit 108 is isolated from the main circuit through a voltage follower circuit. Then, an envelope signal is obtained by extracting a low-frequency data signal modulated on the high-frequency sine wave through the envelope circuit, and then a high-frequency carrier in the envelope signal is filtered by the low-pass filter circuit, to further improve a signal demodulation effect. Finally, the comparator circuit compares a filtered square wave signal with a given value, to restore the data signal of the modulation circuit 107.

The signal receiver coil 202 is connected to the signal demodulation circuit 108. The voltage at both terminals of the signal receiver coil 202 is high, and needs to be divided before being able to be input to the demodulation circuit. When a voltage dividing resistor is selected, matching a power level needs to be paid attention to. A half-wave rectifier circuit is used for rectification. Therefore, a reverse recovery time of a diode is required to be very short. In an experiment, an ultra-fast recovery diode SF26 is used. In an experiment, a voltage follower composed of an operational amplifier is used to isolate the demodulation circuit from the main circuit, and the operational amplifier uses a CMOS operational amplifier LMV358. A main function of the envelope circuit is to extract a low-frequency signal modulated on a high-frequency electromagnetic wave. Generally, a point-contact germanium diode is used in a high-frequency detection circuit, and has the characteristics of small junction capacitance, small reverse current, and high operating frequency. A model selected by the present disclosure is 1N60P. The low-pass filter circuit is to filter a high-frequency carrier in an envelope signal, and a cut-off frequency is designed as a first harmonic. The comparator circuit compares a filtered square wave signal with a given value, to restore an original data signal. A comparator chip is a differential comparison chip LM311 produced by TI Company.

Figure 7:
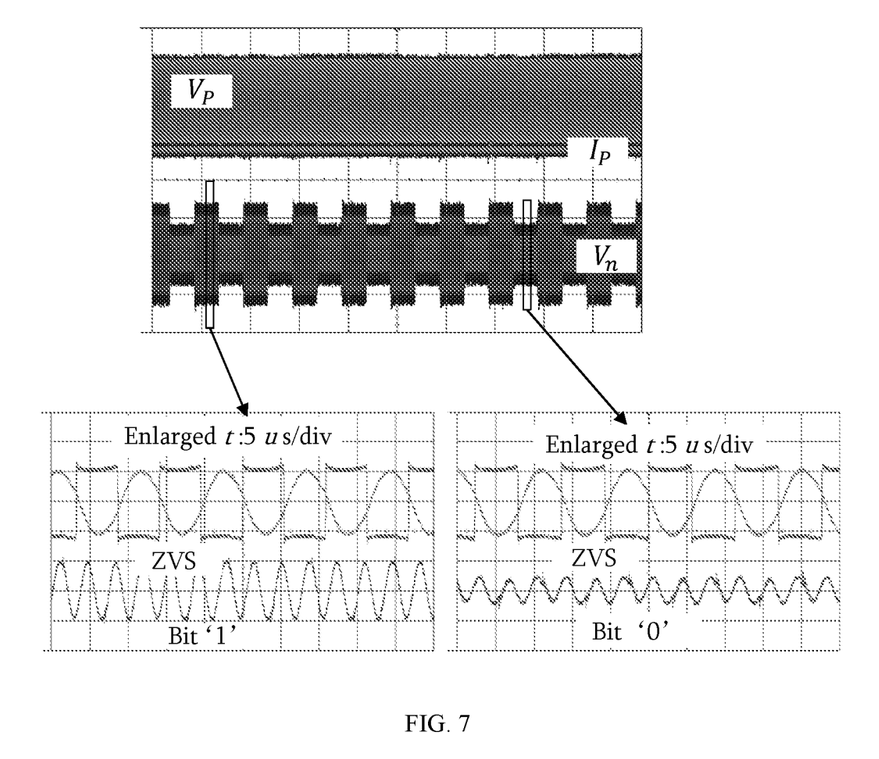
FIG. 7 is the experimental waveform diagram of a system during data transmission.

FIG. 7 is a waveform diagram of an output voltage Vp and an output current Ip of the high-frequency inverter circuit 102 and a voltage Vn on the signal receiver coil 202 when energy and signals are transmitted synchronously in the system. It can be seen from FIG. 5 that, when the high-frequency inverter circuit 102 is driven by the signal modulation circuit 107, and the operating frequency of the high-frequency inverter circuit 102 switches between f0=92 kHz and f1=88 kHz based on a change of "0" and "1" of the data signal, the high-frequency inverter circuit 102 can always implement zero voltage switch (ZVS), and at the same time, the voltage Vn on the signal receiver coil 202 changes obviously, which can reflect a data signal transmitted.

Figure 8:
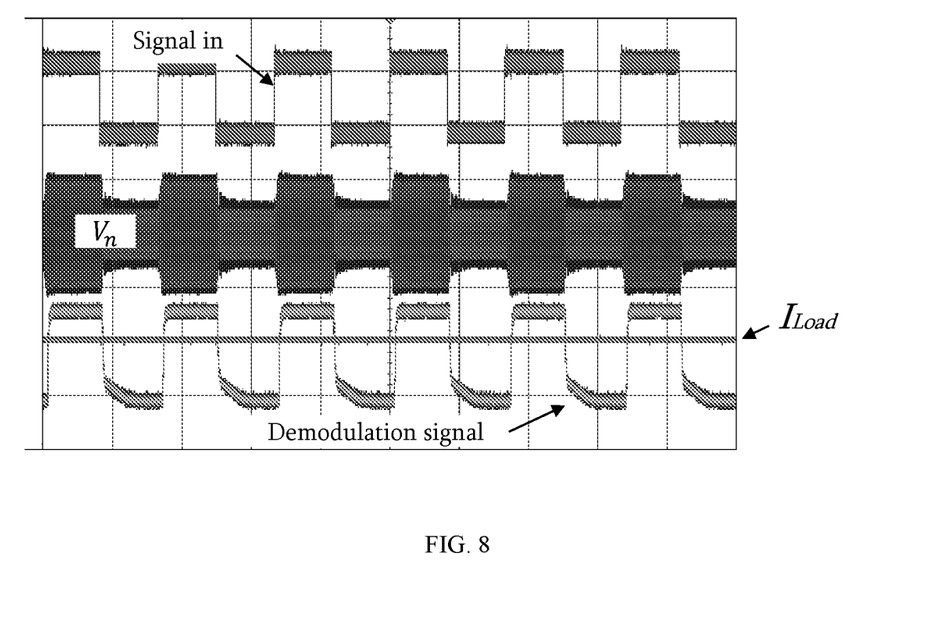
FIG. 8 is an experimental waveform diagram of a system when transmitting data "1010"

FIG. 8 is an experimental waveform diagram of the system when transmitting data "1010". It can be concluded from FIG. 8 that the voltage Vn on the signal receiver coil 202, after being processed by the signal demodulation circuit 108, can well restore a data signal transmitted by a transmit end. Meanwhile, FIG. 8 shows that when the present disclosure is used for synchronous transmission of energy and signal, a current Iload of the system load 106 is not affected by signal transmission and can be kept constant.

Figure 9:
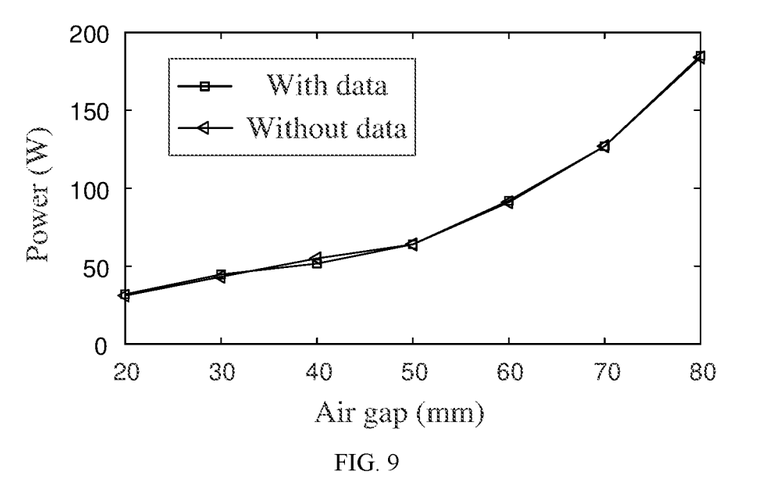
FIG. 9 shows system power test results with and without signal transmission under different air gaps.
Figure 10:
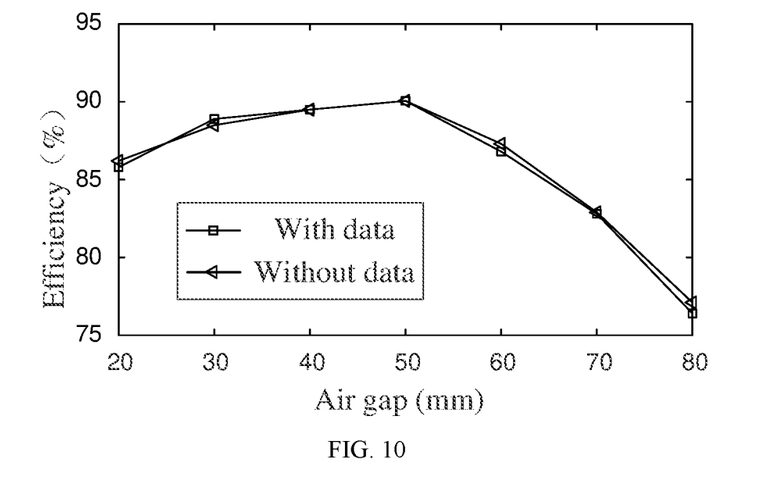
FIG. 10 shows system power test results with and without signal transmission under different air gaps.

In order to further analyze impact of signal transmission on energy transmission when the synchronous transmission system of energy and signal in this specification performs signal transmission, system efficiency and power of the wireless transmission system is tested at different air gaps when signal transmission is performed and data "1010" is transmitted, and when signal transmission is not performed and data "0000" is transmitted, and test results are shown in FIG. 9 and FIG. 10. As shown in FIG. 9, when the air gap increases, the transmission power of the wireless transmission system also increases continuously. The experimental results show that the impact of signal transmission on the transmission power of the system can be ignored. As shown in FIG. 10, when the air gap increases, the transmission efficiency of the wireless transmission system first increases and then decreases. When the air gap is 50 mm, a maximum transmission efficiency can be obtained is 88.76%. According to the experimental results, the efficiency of the wireless power transmission system is almost the same when there is no signal transmission, so impact of signal synchronous transmission on the working efficiency of the system can be ignored.

What is claimed is:

1. A wireless synchronous transmission system of energy and signal based on an integrated magnetic circuit coupling structure, comprising a direct current power supply, a high-frequency inverter circuit, a primary energy transmitter circuit, a secondary receiver circuit, a rectifier circuit, a load, a signal modulation circuit and a signal demodulation circuit, wherein the high-frequency inverter circuit has an input terminal connected to the direct current power supply, and an output terminal connected to the primary energy transmitter circuit, the high-frequency inverter circuit is connected to the signal modulation circuit, and the signal modulation circuit is configured to control an operating frequency of the high-frequency inverter circuit;

the secondary receiver circuit comprises a secondary energy receiver circuit and a secondary signal receiver circuit, the secondary energy receiver circuit is connected to the secondary signal receiver circuit, the primary energy transmitter circuit is connected to the secondary energy receiver circuit and the secondary signal receiver circuit through electromagnetic induction, an output of the energy receiver circuit is connected to the rectifier circuit, the rectifier circuit outputs a direct current power and transmits the direct current power to the load, and the secondary signal receiver circuit is connected to the signal demodulation circuit;

the high-frequency inverter circuit converts a direct current power output from the direct current power supply into a high-frequency alternating current, the high-frequency alternating current forms a high-frequency sine wave after passing through the primary energy transmitter circuit, the high-frequency sine wave acts on the primary energy transmitter circuit, and the primary energy transmitter circuit transmits energy to the secondary energy receiver circuit and transmits a signal to the secondary signal receiver circuit through electromagnetic induction;

a working resonance point of the secondary energy receiver circuit is set to a first harmonic frequency of the high-frequency sine wave, to realize energy transmission; and a working resonance point of the secondary signal receiver circuit is set to a third harmonic frequency of a sine wave, to realize signal transmission.

2. The wireless synchronous transmission system of energy and signal based on the integrated magnetic circuit coupling structure according to claim 1, wherein the primary energy transmitter circuit is a first resistor-inductor-capacitor (RLC) circuit comprising a first resistor, a primary transmitter coil, and a first capacitor that are connected in series, and the secondary energy receiver circuit is a second RLC circuit comprising a second resistor, an energy receiver coil, and a second capacitor that are connected in series, one terminal of the second capacitor and one terminal of the second resistor serve as an output of the secondary energy receiver circuit, and are connected to the rectifier circuit, the secondary signal receiver circuit is a third RLC circuit comprising a third resistor, a signal receiver coil, and a third capacitor that are connected in series, two terminals of the signal receiver coil are connected to the signal demodulation circuit, the energy receiver coil is connected in series with the second resistor and set in parallel with the third RLC circuit, the primary transmitter coil is separately connected to the energy receiver coil and the signal receiver coil through electromagnetic induction, and the signal demodulation circuit performs signal demodulation based on a voltage signal of the signal receiver coil, to restore a data signal of the signal modulation circuit, wherein the primary transmitter coil, the energy receiver coil and the signal receiver coil form the integrated magnetic circuit coupling structure.

3. The wireless synchronous transmission system of energy and signal based on the integrated magnetic circuit coupling structure according to claim 2, wherein, in the integrated magnetic circuit coupling structure, the primary transmitter coil comprises a transmitter coil and a transmitting magnetic core layer stacked up and down, the energy receiver coil is disposed directly above the transmitter coil, the signal receiver coil and the energy receiver coil are stacked up and down, and a receiving magnetic core layer is stacked on the signal receiver coil; and coil directions of the signal receiver coil and the energy receiver coil are orthogonal.

4. The wireless synchronous transmission system of energy and signal based on the integrated magnetic circuit coupling structure according to claim 3, wherein the transmitting magnetic core layer and the receiving magnetic core layer each comprise a plurality of ferrite strips with the same structural size, and the plurality of ferrite strips in each magnetic core layer are evenly laid on an upper surface or a lower surface of a corresponding coil, and a direction of the ferrite strip is perpendicular to a direction of the corresponding coil.

5. The wireless synchronous transmission system of energy and signal based on the integrated magnetic circuit coupling structure according to claim 3, wherein an area of the transmitting magnetic core layer and an area of the receiving magnetic core layer are 80% of an area of the transmitter coil and an area of the energy receiver coil respectively.

6. The wireless synchronous transmission system of energy and signal based on the integrated magnetic circuit coupling structure according to claim 3, wherein dimensions of the transmitting magnetic core layer, the receiving magnetic core layer, the transmitter coil, the signal receiver coil, and the energy receiver coil meet the following requirements:

$$h1 = \frac{1}{2}l1$$
$$l2 = l1$$
$$h2 = \frac{8*(l1*h1*2)}{10l1},$$

wherein l1 is a length of the transmitter coil, the signal receiver coil, or the energy receiver coil, h1 is a width of the transmitter coil, the signal receiver coil, or the energy receiver coil, l2 is a length of each ferrite strip in the transmitting magnetic core layer or the receiving magnetic core layer, and h2 is a width of each ferrite strip in the transmitting magnetic core layer or the receiving magnetic core layer.

7. The wireless synchronous transmission system of energy and signal based on the integrated magnetic circuit coupling structure according to claim 1, wherein the high-frequency inverter circuit is a class E inverter circuit, a half-bridge inverter circuit, or a full-bridge inverter circuit; and the rectifier circuit is a full-bridge rectifier circuit, a half-bridge rectifier circuit, or a synchronous rectifier circuit.

8. The wireless synchronous transmission system of energy and signal based on the integrated magnetic circuit coupling structure according to claim 1, wherein the modulation circuit comprises a frequency selector and a driver circuit that are connected to each other, and the driver circuit is connected to the high-frequency inverter circuit.

9. The wireless synchronous transmission system of energy and signal based on the integrated magnetic circuit coupling structure according to claim 1, wherein the signal demodulation circuit comprises a voltage divider circuit, a signal rectifier circuit, a voltage follower, an envelope circuit, and a low-pass filter circuit, and a comparator circuit that are sequentially connected, and the voltage divider circuit is connected to the secondary signal receiver circuit.

10. The wireless synchronous transmission system of energy and signal based on the integrated magnetic circuit coupling structure according to claim 4, wherein an area of the transmitting magnetic core layer and an area of the receiving magnetic core layer are 80% of an area of the transmitter coil and an area of the energy receiver coil respectively.

11. The wireless synchronous transmission system of energy and signal based on the integrated magnetic circuit coupling structure according to claim 4, wherein dimensions of the transmitting magnetic core layer, the receiving magnetic core layer, the transmitter coil, the signal receiver coil, and the energy receiver coil meet the following requirements:

$$h1 = \frac{1}{2}l1$$
$$l2 = l1$$
$$h2 = \frac{8*(l1*h1*2)}{10l1},$$

wherein l1 is a length of the transmitter coil, the signal receiver coil, or the energy receiver coil, h1 is a width of the transmitter coil, the signal receiver coil, or the energy receiver coil, l2 is a length of each ferrite strip in the transmitting magnetic core layer or the receiving magnetic core layer, and h2 is a width of each ferrite strip in the transmitting magnetic core layer or the receiving magnetic core layer.

12. The wireless synchronous transmission system of energy and signal based on the integrated magnetic circuit coupling structure according to claim 5, wherein dimensions of the transmitting magnetic core layer, the receiving magnetic core layer, the transmitter coil, the signal receiver coil, and the energy receiver coil meet the following requirements:

$$h1 = \frac{1}{2}l1$$
$$l2 = l1$$
$$h2 = \frac{8*(l1*h1*2)}{10l1},$$

wherein l1 is a length of the transmitter coil, the signal receiver coil, or the energy receiver coil, h1 is a width of the transmitter coil, the signal receiver coil, or the energy receiver coil, l2 is a length of each ferrite strip in the transmitting magnetic core layer or the receiving magnetic core layer, and h2 is a width of each ferrite strip in the transmitting magnetic core layer or the receiving magnetic core layer.

* * * * *